United States Patent
Zhang et al.

(10) Patent No.: US 12,392,985 B2
(45) Date of Patent: Aug. 19, 2025

(54) AUTOFOCUS ACTUATOR CONTROL METHOD

(71) Applicant: CHIPSEMI SEMICONDUCTOR (NINGBO) CO., LTD., Ningbo (CN)

(72) Inventors: Yaoguo Zhang, Ningbo (CN); Bo Xia, Ningbo (CN); Yulin Zhang, Ningbo (CN)

(73) Assignee: CHIPSEMI SEMICONDUCTOR ( NINGBO) CO., LTD., Ningbo (CN)

( * ) Notice: Subject to any disclaimer, the term of this patent is extended or adjusted under 35 U.S.C. 154(b) by 724 days.

(21) Appl. No.: 17/551,174

(22) Filed: Dec. 14, 2021

(65) Prior Publication Data

US 2022/0187563 A1    Jun. 16, 2022

(30) Foreign Application Priority Data

Dec. 14, 2020  (CN) .......................... 202011471151.7
Jan. 26, 2021  (CN) .......................... 202110101708.6

(51) Int. Cl.
| | |
|---|---|
| G02B 7/00 | (2021.01) |
| G02B 7/09 | (2021.01) |
| G03B 5/06 | (2021.01) |
| G03B 13/36 | (2021.01) |
| G11B 7/09 | (2006.01) |
| H04N 23/68 | (2023.01) |

(52) U.S. Cl.
CPC .............. *G02B 7/09* (2013.01); *G03B 13/36* (2013.01)

(58) Field of Classification Search
CPC .......... G02B 7/004; G02B 7/282; G02B 7/00; G02B 7/003; G02B 7/147; G02B 7/023; G03B 17/08; H02K 11/21
USPC ....... 359/822, 811, 813, 814, 819, 821, 823, 359/824, 825; 396/29, 55, 79; 348/208.99
See application file for complete search history.

(56) References Cited

U.S. PATENT DOCUMENTS

| | | | | |
|---|---|---|---|---|
| 6,148,151 A | * | 11/2000 | Bauer ..................... | G03B 17/14 |
| | | | | 396/88 |
| 8,988,586 B2 | * | 3/2015 | Mckinley ............... | G03B 13/36 |
| | | | | 396/79 |
| 2008/0055425 A1 | * | 3/2008 | Kuiper ................. | G02B 26/005 |
| | | | | 348/222.1 |
| 2014/0028897 A1 | * | 1/2014 | Azuma .................. | H04N 23/57 |
| | | | | 348/357 |
| 2017/0346999 A1 | * | 11/2017 | Topliss ................... | H04N 23/54 |
| 2021/0223536 A1 | * | 7/2021 | Brunner ............. | G02B 26/0841 |

* cited by examiner

*Primary Examiner* — Dawayne Pinkney
(74) *Attorney, Agent, or Firm* — Javalon Law, PC

(57) ABSTRACT

In accordance with the present disclosure, a method for controlling an autofocus actuator is provided such that the actual position of the autofocus actuator can be measured using capacitance sensing. In some embodiments, a rotor plate attached to a rotor and a stator plate attached to a stator in the autofocus actuator can be used to create a capacitance. When the rotor moves, a capacitance change value between the rotor plate and the stator plate can be measured. In these embodiments, the cost and the form factor of the aforementioned autofocus actuator are reduced compared to implementation of magnetic field sensors in the autofocus actuator.

5 Claims, 9 Drawing Sheets

AUTOFOCUS ACTUATOR CONTROL METHOD

FIELD OF THE INVENTION

The present application generally pertains to control of autofocus actuator.

BACKGROUND OF THE INVENTION

An actuator is a component of a machine that is responsible for moving and controlling a mechanism or system, for example by opening a valve. An actuator requires a control signal and a source of energy. The control signal is relatively low energy and may be electric voltage or current, pneumatic, or hydraulic fluid pressure, or even human power. The source of energy may be an electric current, hydraulic pressure, or pneumatic pressure. When the actuator receives a control signal, it responds by converting the source of energy into mechanical motion. In the electric, hydraulic, and pneumatic sense, it is a form of automation or automatic control.

BRIEF SUMMARY OF THE INVENTION

In accordance with the present disclosure, a method for controlling an autofocus actuator is provided such that the actual position of the autofocus actuator can be measured using capacitance sensing. In some embodiments, a rotor plate attached to a rotor and a stator plate attached to a stator in the autofocus actuator can be used to create a capacitance. When the rotor moves, a capacitance change value between the rotor plate and the stator plate can be measured. In these embodiments, the cost and the form factor of the aforementioned autofocus actuator are reduced compared to implementation of magnetic field sensors in the autofocus actuator.

In some embodiments, a method for controlling an autofocus actuator is based on a capacitance measured between a rotor plate attached to a rotor and a stator plate attached to a stator in the autofocus actuator. In those embodiments, the method includes: determining, at an autofocus sensor, a predetermined distance and a predetermined direction for moving the rotor in an image autofocus process; determining, at a processing unit, a desired capacitance value between the rotor plate and the stator plate based on the predetermined distance and the predetermined direction; measuring, at a capacitance sensing circuit, the capacitance between the rotor plate and the stator plate; determining, at the processing unit, whether the measured capacitance value matches the desired capacitance value; and moving, at a rotor drive block, the rotor based on whether the measured capacitance value matches the desired capacitance value.

DETAILED DESCRIPTION OF THE INVENTION

Figure 1:
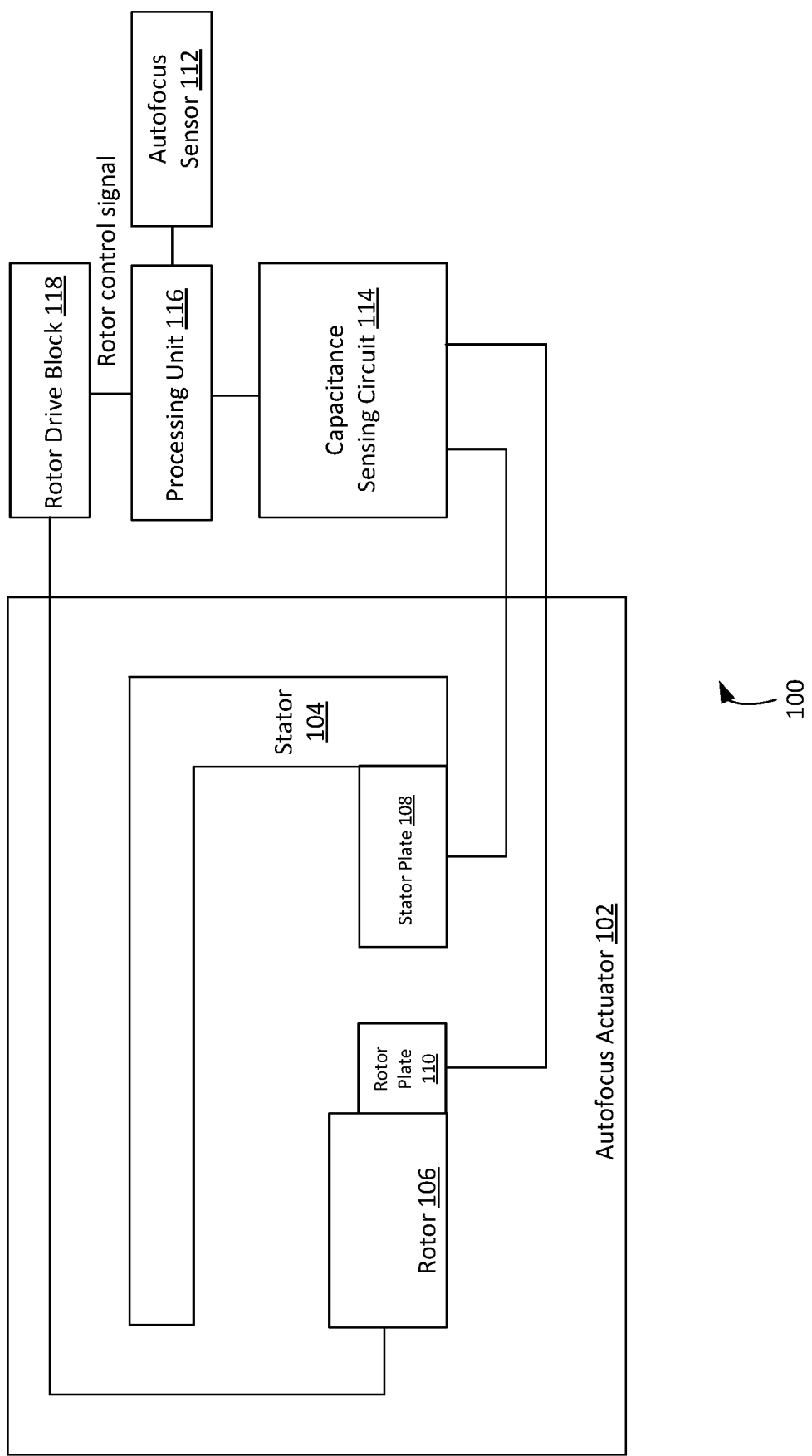
FIG. 1 illustrates an autofocus actuator control system 100, according to an exemplary embodiment of the present disclosure.

Particular embodiments of the invention are illustrated herein in conjunction with the drawings.

Various details are set forth herein as they relate to certain embodiments. However, the method can also be implemented in ways which are different from those described herein. Modifications can be made to the discussed embodiments by those skilled in the art without departing from the method. Therefore, the method is not limited to particular embodiments disclosed herein.

An actuator is a mechanism by which a control system acts upon to perform an operation or task. Various types of actuators are used in different applications including mechanical, thermal, electrical, camera, and/or other types of applications. In camera applications, an autofocus actuator may be configured to include a rotating mechanical focus ring to move a focusing lens towards or away from an autofocus sensor to accomplish an image autofocus process. The purpose of the image autofocus process is to control a position of convergence of a light such that the light converges precisely at a plane of the autofocus sensor. In this way, an image captured by the camera is in focus. As camera systems have become more widespread, improving autofocus speed and accuracy in the image autofocus process has garnered some attention. The challenge is to control the autofocus actuator to move the focusing lens with high speed, high accuracy, and low cost to accomplish the image autofocus process.

One necessary step in the image autofocus process is determination of a desired distance for moving the focusing lens. Once the desired distance is determined, the autofocus actuator is then configured to move the focusing lens for the desired distance. During movement of the focusing lens, to verify an actual position of the focusing lens, a magnetic field sensor can be used. The magnetic field sensor may be configured to detect changes of a magnetic field surrounding the autofocus actuator when the autofocus actuator moves. The changes in the magnetic field can be then converted to electric signals in the magnetic field sensor, and the electric signals can be sent to processing units for determining an actual position of the autofocus actuator and the focusing lens. Finally, the actual position of the focusing lens is compared to the desired distance to verify whether an image is in focus or not.

One insight provided by the present disclosure is that implementation of magnetic field sensors in the image autofocus process can drive up a cost and a form factor (such as a size) of the autofocus actuator. Given the same form factor (such as a size) of an autofocus actuator, a large form factor (such as a size) of the magnetic field sensor would further limit the form factor (such as a size) of other parts of the autofocus actuator such as a rotor. A limited form factor (such as a size) of the rotor in the autofocus actuator will in turn decrease efficiency of the rotor in the autofocus actuator.

In accordance with the present disclosure, a method for controlling an autofocus actuator is provided such that the actual position of the autofocus actuator can be measured using capacitance sensing. In some embodiments, a rotor plate attached to a rotor and a stator plate attached to a stator in the autofocus actuator can be used to create a capacitance. When the rotor moves, a capacitance change value between the rotor plate and the stator plate can be measured. In these embodiments, the cost and the form factor of the aforementioned autofocus actuator are reduced compared to implementation of magnetic field sensors in the autofocus actuator.

FIG. 1 illustrates an autofocus actuator control system 100, according to an exemplary embodiment of the present disclosure. In some embodiments, the autofocus actuator control system 100 comprises an autofocus actuator 102, a capacitance sensing circuit 114, a processing unit 116, a rotor drive block 118, an autofocus sensor 112, and/or any other components. An autofocus actuator 102 may be referred to an actuator in an optical instrument that captures visual images configured to move a focusing lens within the optical instrument to accomplish autofocus. Examples of an autofocus actuator 102 include electromagnetic actuator, electric actuator, shape memory alloys actuator, and/or any other types of autofocus actuator.

In some embodiments, the autofocus actuator 102 includes a stator 104, a rotor 106, a stator plate 108, a rotor plate 110, and/or any other component. The stator 104 may be referred to a stationary part of a rotary system such as electric generators, electric motors, sirens, mud motors, biological rotors, anti-vibration actuators, and/or any other rotary systems. Examples of a stator 104 include concentric single layer winding stator, concentric double layer winding stator, fractional concentric winding stator, and/or any other types of stators. The rotor 106 may be referred to a moving component of a rotary system. Examples of a rotor 106 include squirrel-cage rotor, wound rotor, salient pole rotor, non-salient rotor, and/or any other types of rotors. In this exemplary embodiment, the rotor 106 is attached to the rotor plate 110, and the stator 104 is attached to the stator plate 108. The stator plate 108 and the rotor plate 110 may be referred to two metal plates used to create a capacitor. Examples of a stator plate 108 and a rotor plate 110 include iron plate, copper plate, silver plate, aluminum plate, and/or other types of metal plate.

In this embodiment, the stator plate 108 and the rotor plate 110 are configured to face each other with a distance and an overlap area to create a capacitance: $C=\varepsilon_0 \cdot A/d$, where C is the created capacitance value, $\varepsilon_0$ is an electric constant with $\varepsilon_0 = 8.854 \times 10^{-12}$ F·m$^{-1}$, A is the overlap area between the stator plate 108 and the rotor plate 110, and d is the distance between the stator plate 108 and the rotor plate 110.

The autofocus sensor 112 is operatively connected to the processing unit 116. An autofocus sensor 112 may be referred to a device configured to measure relative focus of an image in a camera by assessing changes in image contrast where maximal contrast is assumed to correspond to maximal sharpness. Examples of an autofocus sensor 112 include contrast detection autofocus sensor, phase detection autofocus sensor, active autofocus sensor, and/or any other types of autofocus sensor. In one example, the autofocus sensor 112 shines a light-emitting diode (LED) light to a subject and calculates a distance between the autofocus sensor 112 and the subject based on a time it takes for the light to travel to the subject and back. Based on the calculated distance between the autofocus sensor 112 and the subject, the autofocus sensor 112 is configured to determine a predetermined distance and a predetermined direction for moving the rotor 106 to accomplish the image autofocus process.

A processing unit 116 may be referred to an electronic circuitry configured to execute computer instructions to perform one or more specific tasks. Examples of a processing unit 116 include central processing unit, application-specific integrated circuit, and/or any other types of processing unit. In some embodiments, the processing unit 116 is configured to determine a desired capacitance value between the stator plate 108 and the rotor plate 110. The desired capacitance value corresponds to a distance that the rotor 106 needs to move to accomplish the image autofocus process.

In this embodiment, the capacitance sensing circuit 114 is operatively connected to the processing unit 116. A capacitance sensing circuit 114 may be referred to an electronic circuit configured to measure a capacitance value between two electrically conducting plates. Examples of a capacitance sensing circuit 114 include relaxation oscillator, capacitive divider circuit, and/or any other types of capacitance sensing circuits. In some embodiments, the capacitance sensing circuit 114 is configured to measure a capacitance value between the stator plate 108 and the rotor plate 110, and send the measured capacitance value to the processing unit 116. The processing unit 116 is then configured to send a rotor control signal to the rotor drive block 118 based on a comparison between the desired capacitance value and the measured capacitance value. A rotor control signal may be referred to a digitally encoded electronic signal used to control the rotor 106. Examples of a rotor control signal include digitally encoded electronic signal for move forward action, move backward action, move left action, move right action, move up action, move down action, move distance, and/or any other types of rotor control signals.

In this embodiment, the rotor drive block 118 is operatively connected to the processing unit 116 and the rotor 106. A rotor drive block 118 may be referred to a device configured to produce a force that generates a torque to move the rotor 106 based on a rotor control signal. Examples of a rotor drive block 118 include alternating current-based rotor drive block, magnetic field-based rotor drive block, and/or any other types of rotor drive block.

In some examples, the capacitance sensing circuit 114 is connected to the rotor plate 110 and the stator plate 108 to measure the capacitance between the rotor plate 110 and the stator plate 108. When the rotor 106 moves towards the predetermined direction for the predetermined distance, the rotor plate 110 moves along with the rotor 106. Meanwhile, the stator 104 and the attached stator plate 108 are kept stationary. A stationary stator 104 and a stationary stator plate 108 may be referred to a stator 104 and a stator plate 108 that are non-moving. The moving rotor plate 110 and the stationary stator plate 108 will change either the overlap area A or the distance d between the two plates, resulting in an updated capacitance value measured at the capacitance sensing circuit 114 as $C=\varepsilon_0 \cdot A/d$. Then the processing unit 116 is configured to compare the updated capacitance value and the desired capacitance value. If the updated capacitance value matches the desired capacitance value, then the processing unit 116 sends a rotor control signal to the rotor drive block 118 to stop the rotor 106 from moving. Otherwise, if the updated capacitance value does not match the desired capacitance value, the processing unit 116 sends a rotor control signal to the rotor drive block 118 to continue moving the rotor 106 towards the predetermined direction.

Figure 2:
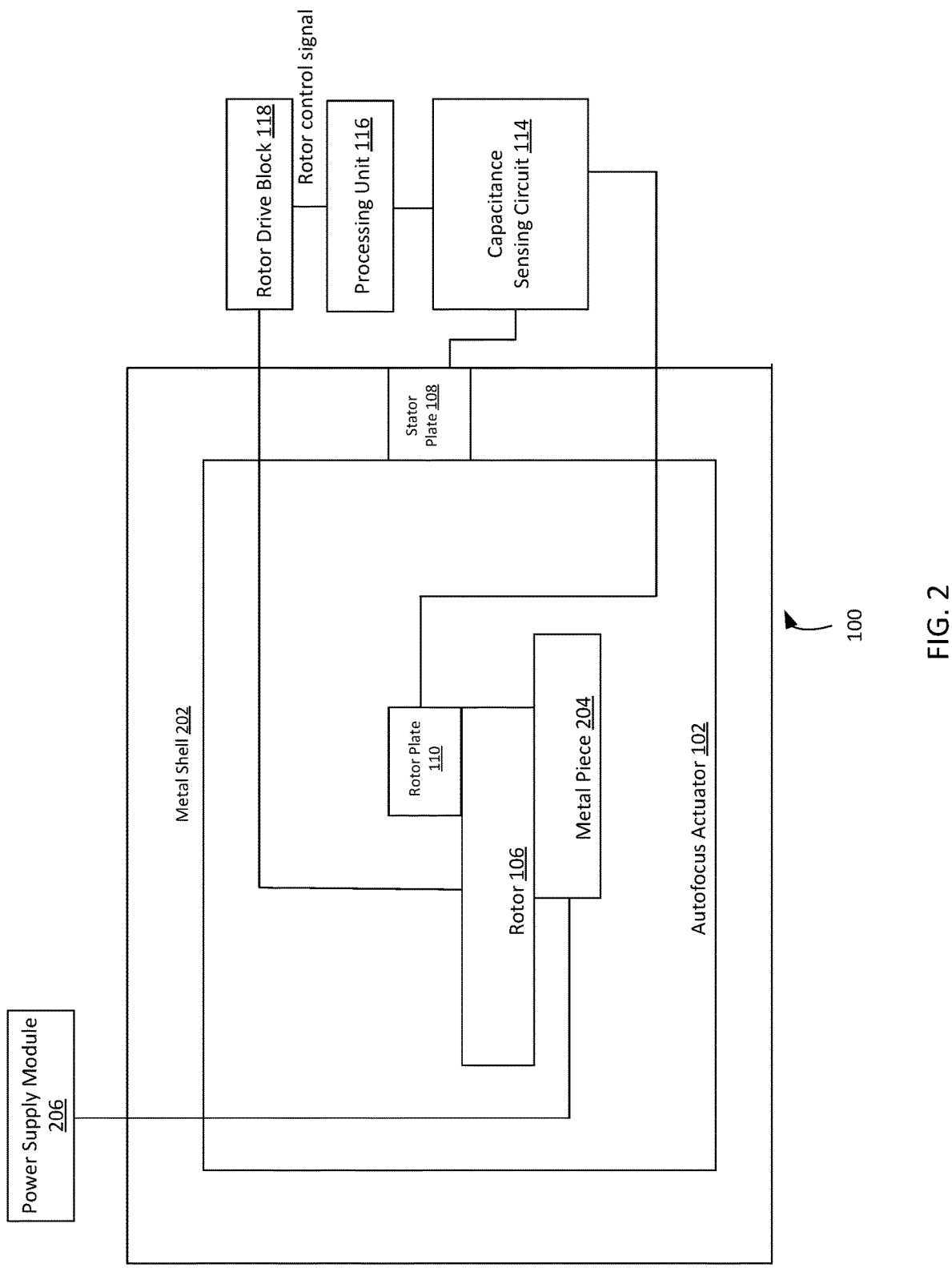
FIG. 2 illustrates another example of the autofocus actuator control system 100, according to an exemplary embodiment of the present disclosure.

FIG. 2 illustrates another example of the autofocus actuator control system 100, according to an exemplary embodiment of the present disclosure. As can be seen, in this example, the autofocus actuator 102 is protected by a metal shell 202, and the autofocus actuator 102 comprises the rotor 106, the rotor plate 110, a metal piece 204, and/or any other components. A metal shell 202 may be referred to a layer of metal used to protect the autofocus actuator 102. Examples of a metal shell 202 include steel shell, iron shell, copper shell, silver shell, and/or any other types of metal shell. In some embodiments, the metal shell 202 comprises the stator plate 108, and the stator plate 108 is positioned to face the rotor plate 110 to create a capacitance. In this way, the cost and the form factor of the autofocus actuator 102 are reduced compared to implementation of an autofocus actuator 102 with specifically designated stator plate 108.

In this embodiment, the metal piece 204 is attached to the rotor 106 and a power supply module 206. A metal piece 204 may be referred to a part of an autofocus actuator necessary for operations the autofocus actuator. Examples of a metal piece 204 include steel piece, iron piece, copper piece, and/or any other types of metal piece. A power supply module 206 may be referred to an electrical device that supplies electric power to an electrical load. Examples of a power supply module 206 include electric battery, direct current (DC) power supply device, alternating current (AC) power supply device, and/or any other types of power supply modules. In some embodiments, the power supply module 206 is a necessary part in the autofocus actuator control system 100. In these embodiments, the power supply module 206 is configured to supply an electric power to the rotor plate 110 through the metal piece 204 and the rotor 106. The supplied electric power at the rotor plate 110 is necessary for creating the capacitance between the rotor plate 110 and the stator plate 108. In this way, the cost and the form factor of the autofocus actuator 102 are reduced compared to implementation of dedicated power supply for the rotor plate 110 in the autofocus actuator 102. Please reference FIG. 1 and its associated texts for structure and functions of other components included in this example.

Figure 3:
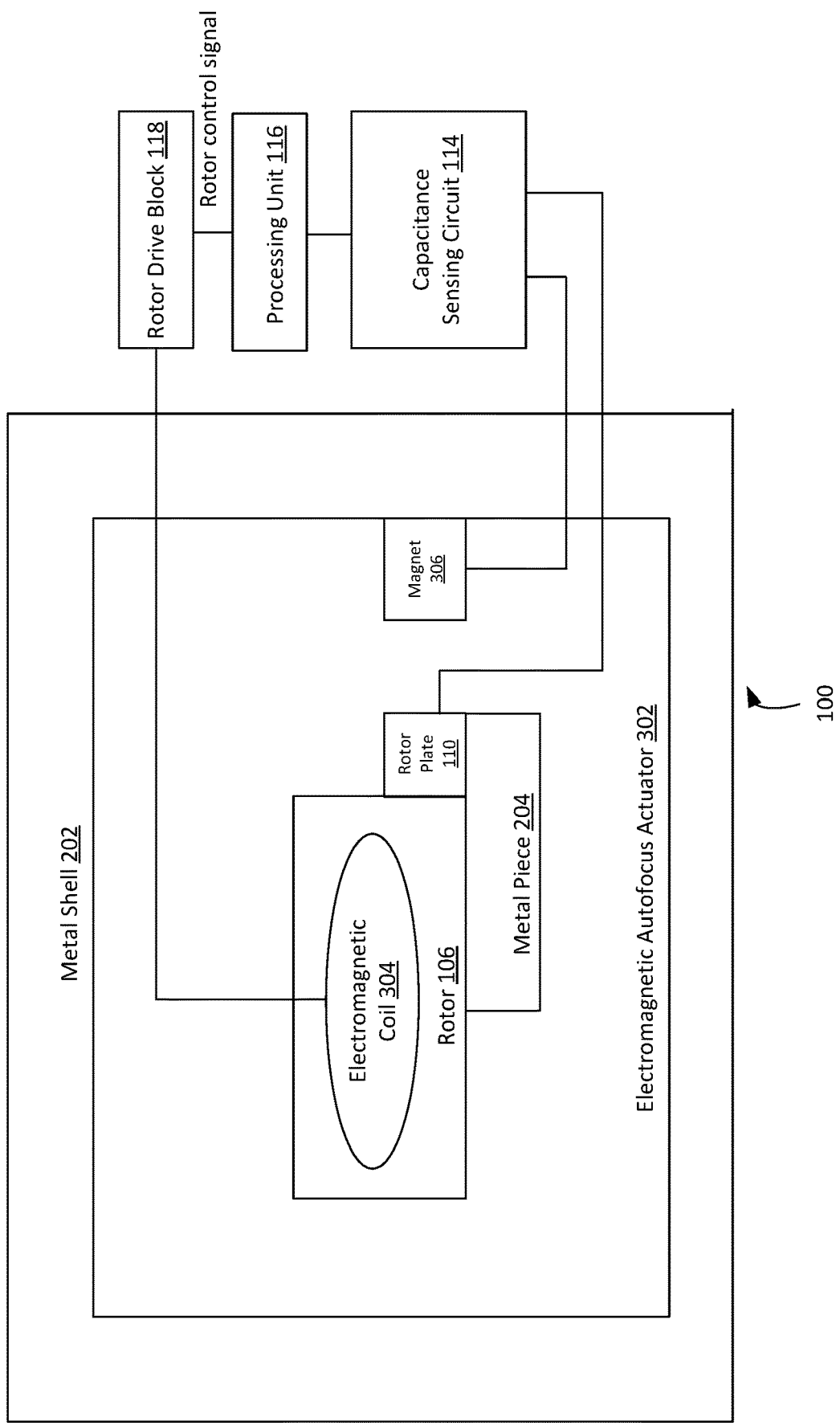
FIG. 3 illustrates yet another example of the autofocus actuator control system 100, according to an exemplary embodiment of the present disclosure.

FIG. 3 illustrates yet another example of the autofocus actuator control system 100, according to an exemplary embodiment of the present disclosure. As can be seen, in this example, the autofocus actuator control system 100 comprises an electromagnetic autofocus actuator 302 protected by the metal shell 202, the capacitance sensing circuit 114, the processing unit 116, the rotor drive block 118, and/or any other components. An electromagnetic autofocus actuator 302 may be referred to an autofocus actuator that produces force and torque by means of magnetic field. Examples of an electromagnetic autofocus actuator 302 include linear solenoid actuator, rotary solenoid actuator, moving coil actuator, micro-electro-mechanical systems (MEMS) magnetic actuator, and/or any other types of electromagnetic autofocus actuator.

In this example, the electromagnetic autofocus actuator 302 comprises the rotor 106 attached to the rotor plate 110 and the metal piece 204, an electromagnetic coil 304, a magnet 306 attached to the metal shell 202, and/or any other components. An electromagnetic coil 304 may be referred to an electrical conductor that contains a series of conductive wires wrapped around a ferromagnetic core that is cylindrical, toroidal, or disk-like. Examples of an electromagnetic coil include DC coil, audio-frequency coil, radio-frequency coil, and/or any other types of electromagnetic coil. In some embodiments, the electromagnetic coil 304 is a part of the electromagnetic autofocus actuator 302 necessary for operations of the electromagnetic autofocus actuator 302.

A magnet 306 may be referred to a material or object that produces a magnetic field. Examples of a magnet 306 include iron magnet, nickel magnet, steel magnet, and/or any other types of magnets. In some embodiments, the rotor drive block 118 is operatively connected to the electromagnetic coil 304 to pass a current through the electromagnetic coil 304 based on the rotor control signal obtained/received from the processing unit 116. The current passed through the electromagnetic coil 304 produces a magnetic field with a magnetic flux density at the electromagnetic coil 304. Based on interactions between the electromagnetic coil 304 and the magnet 306, a force proportional to the magnetic flux density and the current passed through the electromagnetic coil 304 is developed to move the rotor 106.

In this example, the magnet 306 is the stator plate 108 and the magnet 306 is positioned to face the rotor plate 110 to create a capacitance between the stator plate 108 and the rotor plate 110. In this way, the cost and the form factor of the autofocus actuator 102 are reduced compared to implementation of an autofocus actuator 102 with a specifically designated stator plate 108. Please reference FIG. 1, FIG. 2 and their associated texts for structure and functions of other components included in this example.

Figure 4:
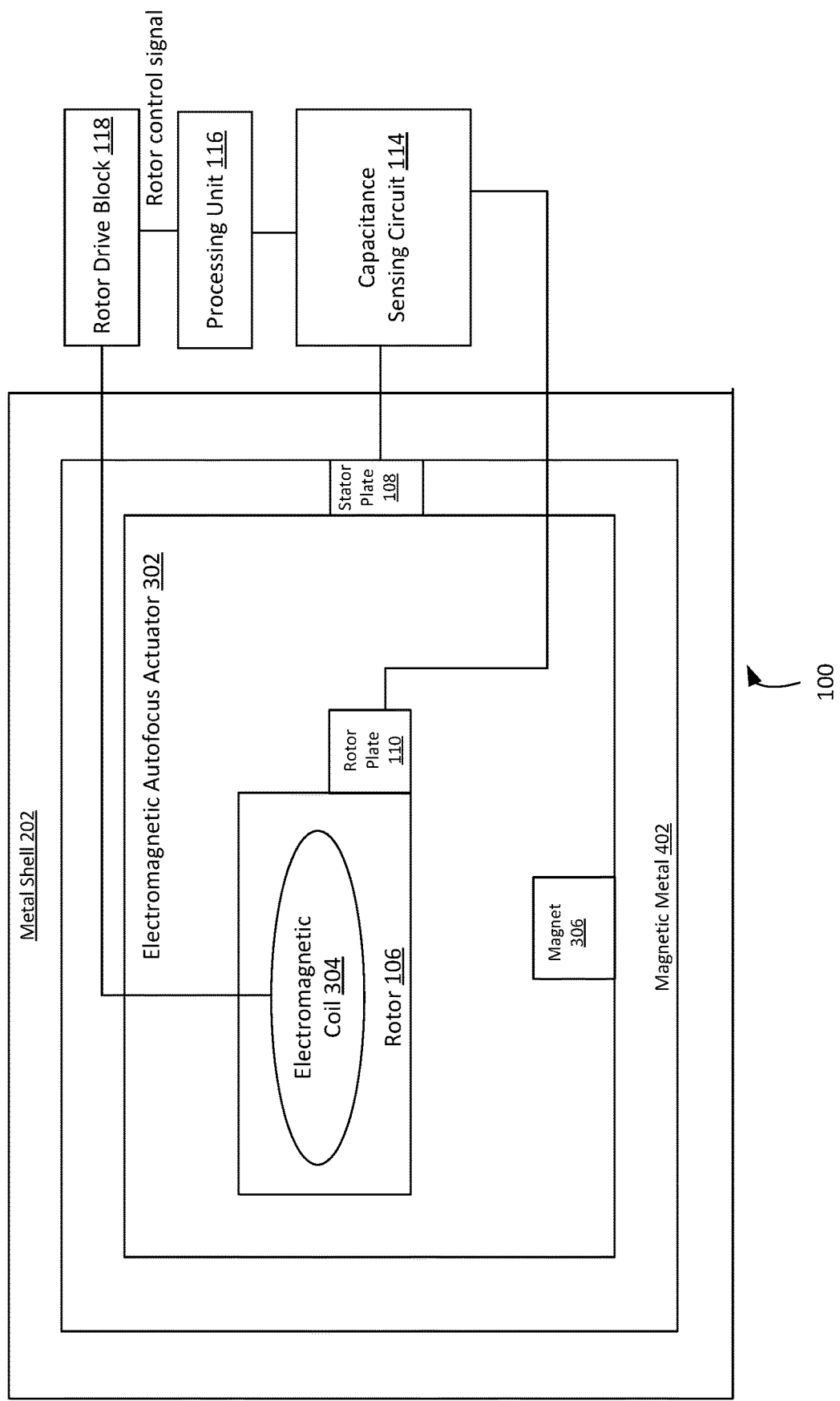
FIG. 4 illustrates still another example of the autofocus actuator control system 100, according to an exemplary embodiment of the present disclosure.

FIG. 4 illustrates still another example of the autofocus actuator control system 100, according to an exemplary embodiment of the present disclosure. As can be seen, in this example, the autofocus actuator control system 100 comprises the electromagnetic autofocus actuator 302, a magnetic metal 402, the metal shell 202, the capacitance sensing circuit 114, the processing unit 116, the rotor drive block 118, and/or any other components. A magnetic metal 402 may be referred to a metal material used to confine a magnetic field produced at the electromagnetic coil 304. Examples of a magnetic metal 402 include steel, silver, copper, iron, and/or any other types of magnetic metal.

In this example, the electromagnetic autofocus actuator 302 is attached to the magnetic metal 402. The electromagnetic autofocus actuator 302 and the magnetic metal 402 are protected by the metal shell 202. The electromagnetic autofocus actuator comprises the rotor 106 attached to the rotor plate 110, the electromagnetic coil 304, the magnet 306, and/or any other components. The magnetic metal 402 is configured to provide a magnetic confinement to the magnetic field produced at the electromagnetic coil 304. The magnetic confinement provided by the magnetic metal 402 can increase the magnetic flux density in the magnetic field. The increased magnetic flux can further increase the force developed at the electromagnetic coil 304 to move the rotor 106. In this way, the increased force to move the rotor 106 can result in a higher speed in moving the rotor 106 and improve an efficiency in the electromagnetic autofocus actuator 302.

In this example, the magnetic metal 402 comprises the stator plate 108, and the stator plate 108 is positioned to face the rotor plate 110 to create a capacitance. In this way, the cost and the form factor of the electromagnetic autofocus actuator 302 are reduced compared to implementation of an electromagnetic autofocus actuator 302 with a specifically designated stator plate 108. As can be seen in FIG. 4, the magnet 306 is attached to the magnetic metal 402 with a contact area. This contact area does not overlap with the area of the capacitance created between the rotor plate 110 and the stator plate 108. In this way, an interference caused by interactions between the magnet 306 and the created capacitance can be avoided. Please reference FIG. 1, FIG. 2, FIG. 3, and their associated texts for structure and functions of other components included in this embodiment.

Figure 5:
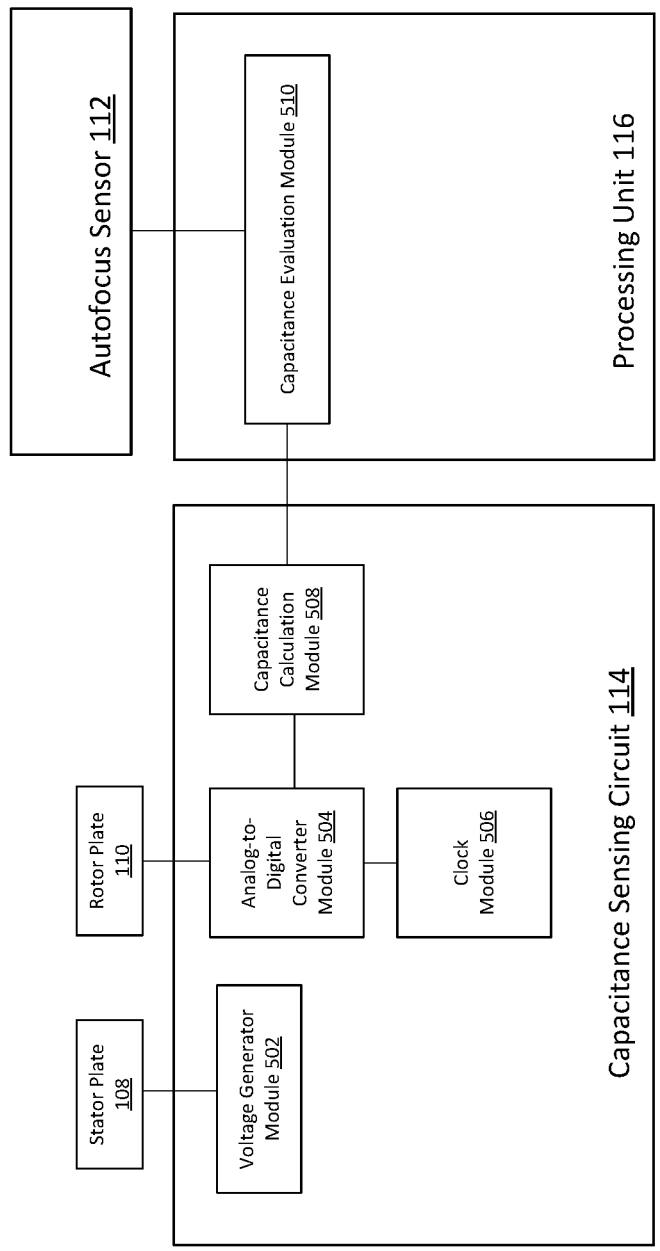
FIG. 5 illustrates an embodiment of a capacitance sensing circuit 114 and a processing unit 116, according to an exemplary embodiment of the present disclosure.

FIG. 5 illustrates an embodiment of the capacitance sensing circuit 114 and the processing unit 116. As can be seen, in this embodiment, the capacitance sensing circuit 114 comprises a voltage generator module 502, an analog-to-digital converter module 504, a clock module 506, a capacitance calculation module 508, and/or any other components. The processing unit 116 comprises a capacitance evaluation module 510, and/or any other components.

A voltage generator module 502 may be referred to an electronic device that generates voltage signals with set properties of amplitude, frequency, and wave shape. Examples of a voltage generator module 502 include function generator, sinusoidal signal generator, pulse-width modulation (PWM) signal generator, arbitrary waveform generator, digital pattern generator, and/or any other types of voltage generators. An analog-to-digital converter module 504 may be referred to an electronic device that converts an analog voltage signal into a digital signal. Examples of an analog-to-digital converter module 504 include flash analog-to-digital converter, successive-approximation analog-to-digital converter, ramp-compare analog-to-digital converter, and/or any other types of analog-to-digital converter. A clock module 506 may be referred to an electronic oscillator that produces a voltage signal that oscillates between a high and a low state at a predetermined frequency. Examples of a clock module 506 include variable frequency oscillator, quartz piezo-electric oscillator, and/or any other types of oscillators.

A capacitance calculation module 508 may be referred to a digital circuit configured to determine a capacitance value between the stator plate 108 and the rotor plate 110 based on a digital voltage value received/obtained from the analog-to-digital converter module 504. A capacitance evaluation module 510 may be referred to a digital circuit configured compare a calculated capacitance value received/obtained from the capacitance calculation module 508 to a desired capacitance value. Examples of a capacitance calculation module 508 and a capacitance evaluation module 510 include application-specific integrated circuit, complex programmable logic device, and/or any other types of modules.

In this embodiment, the voltage generator module 502 and the analog-to-digital converter module 504 are operatively connected to two terminals of a capacitor. The analog-to-digital converter module 504 is operatively connected to the capacitance calculation module 508 and the clock module 506. The capacitance calculation module 508 is operatively connected to the capacitance evaluation module 510 in the processing unit 116. The capacitance evaluation module 510 is operatively connected to the autofocus sensor 112.

In one example, the voltage generator module 502 generates a sinusoidal voltage signal at one terminal of the capacitor. A corresponding output voltage signal is created at the other terminal of the capacitor due to existence of a capacitance C between the two terminals of the capacitor. In this example, the analog-to-digital converter module 504 is configured to convert the output voltage signal to a digital signal proportional to the output signal. The conversion from the output voltage signal to the digital signal is synchronized by the clock module 506. Based on the digital signal converted at the analog-to-digital converter module 504 and the sinusoidal voltage signal generated at the voltage generator module 502, the capacitance calculation module 508 is configured to calculate the capacitance C between the two terminals of the capacitor.

In this example, the capacitance calculation module 508 is operatively connected to the capacitance evaluation module 510 in the processing unit 116. The capacitance evaluation module 510 is configured to receive/obtain the calculated capacitance value from the capacitance calculation module 508. The capacitance evaluation module 510 is also configured to receive/obtain the predetermined distance and direction from the autofocus sensor 112. Based on the received/obtained predetermined distance and direction, the capacitance evaluation module 510 is configured determine a desired capacitance value. In some embodiments, the capacitance evaluation module 510 compares the calculated capacitance value to the desired capacitance value. If the calculated capacitance value matches the desired capacitance value, then the capacitance evaluation module 510 sends a rotor control signal to the rotor drive block 118 to stop the rotor 106 from moving. If the calculated capacitance value does not match the desired capacitance value, the capacitance evaluation module 510 sends a rotor control signal to the rotor drive block 118 to continue to move the rotor 106.

Figure 6:
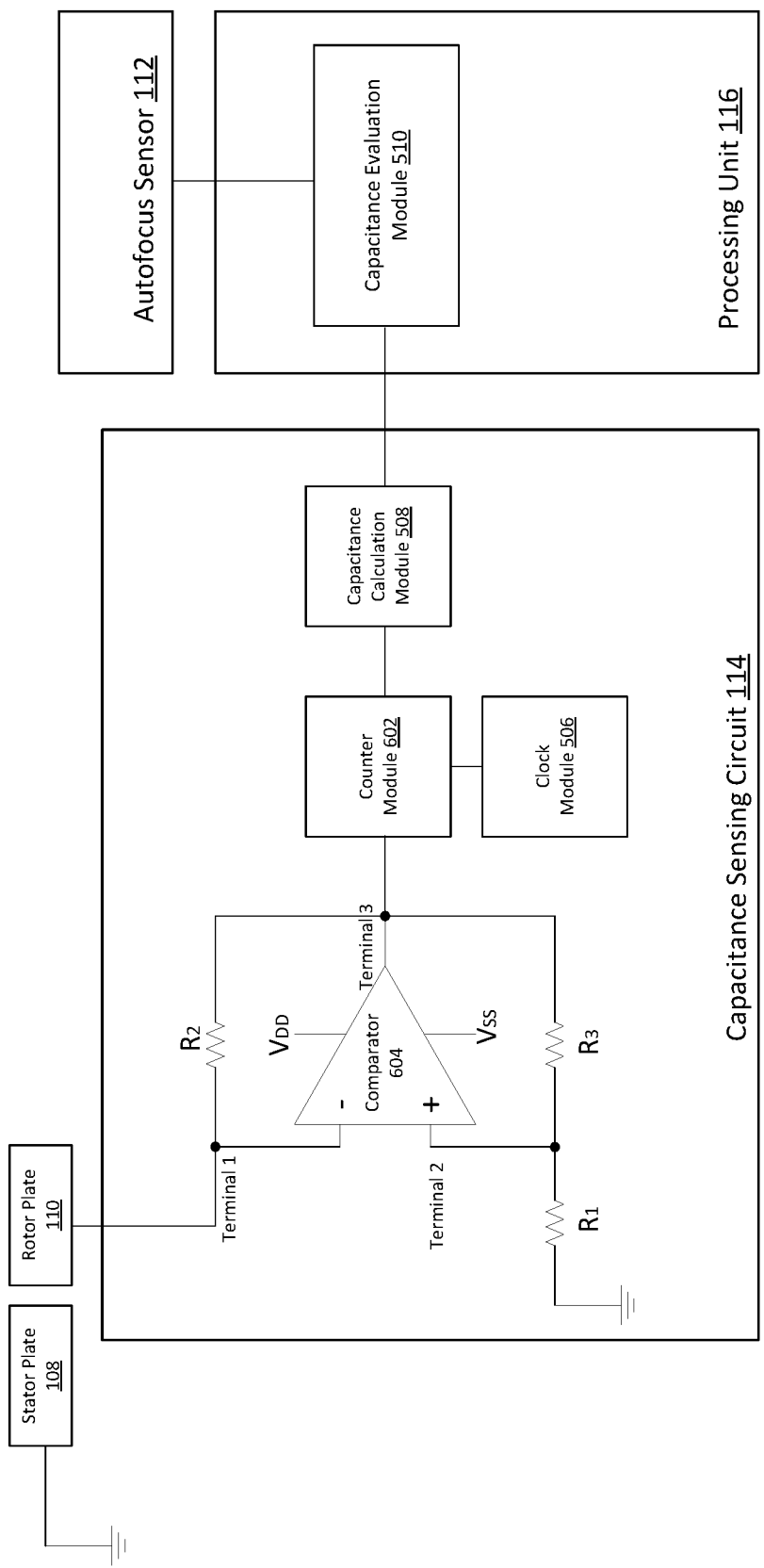
FIG. 6 illustrates another embodiment of the capacitance sensing circuit 114 and the processing unit 116, according to an exemplary embodiment of the present disclosure.

FIG. 6 illustrates another embodiment of the capacitance sensing circuit 114 and the processing unit 116. As can be seen, in this embodiment, the capacitance sensing circuit 114 comprises a clock module 506, a capacitance calculation module 508, a counter module 602, a comparator 604, three resistors R1, R2, R3, one ground, and/or any other components. The processing unit 116 comprises the capacitance evaluation module 510, and/or any other components. A counter module 602 may be referred to a digital circuit configured to count a number of times a particular event or process has occurred. Examples of a counter module 602 include decade counter, ring counter, Johnson counter, and/or any other types of counters. The comparator 604 may be referred to an electronic circuit that compares two voltages and outputs a digital signal indicating which is larger. Examples of a comparator 604 include operational amplifier comparator, dynamic latched comparator, and/or any other types of comparators.

In this embodiment, terminal 1 of the resistor R2 is connected to the "minus" input of the comparator 604 and the rotor plate 110. Terminal 2 of the resistor R1 and the resistor R3 is connected to the "plus" input of the comparator 604. Terminal 3 of the resistor R2 and the resistor R3 is connected to the output of the comparator 604 and the counter module 602. In some examples, the resistors R1, R2, and R3 have a resistance value of R, and the comparator 604 is powered up by a higher voltage $V_{DD}$ and a lower voltage $V_{SS}$. A period T of oscillation created at the output of the comparator 604 can be calculated by a formula:

$$T = (R \cdot C)\left[\ln\left(\frac{2V_{SS} - V_{DD}}{V_{SS}}\right) + \ln\left(\frac{2V_{DD} - V_{SS}}{V_{DD}}\right)\right].$$

The period T is detected at the counter module 602 by measuring a time between two consecutive rising edges of an oscillation at the output of the comparator 604 using the clock module 506. The counter module 602 then sends a value of T to the capacitance calculation module 508. In this way, with known T, R, $V_{DD}$ and $V_{SS}$ values, the capacitance C between the stator plate 108 and the rotor plate 110 can be calculated at the capacitance calculation module 508 using a formula:

$$C = T \Big/ \left[ R \cdot \ln\left(\frac{2V_{SS} - V_{DD}}{V_{SS}}\right) + R \cdot \ln\left(\frac{2V_{DD} - V_{SS}}{V_{DD}}\right) \right].$$

Please reference FIG. 5 and its associated texts for structure and functions of other components included in this example.

Figure 7:
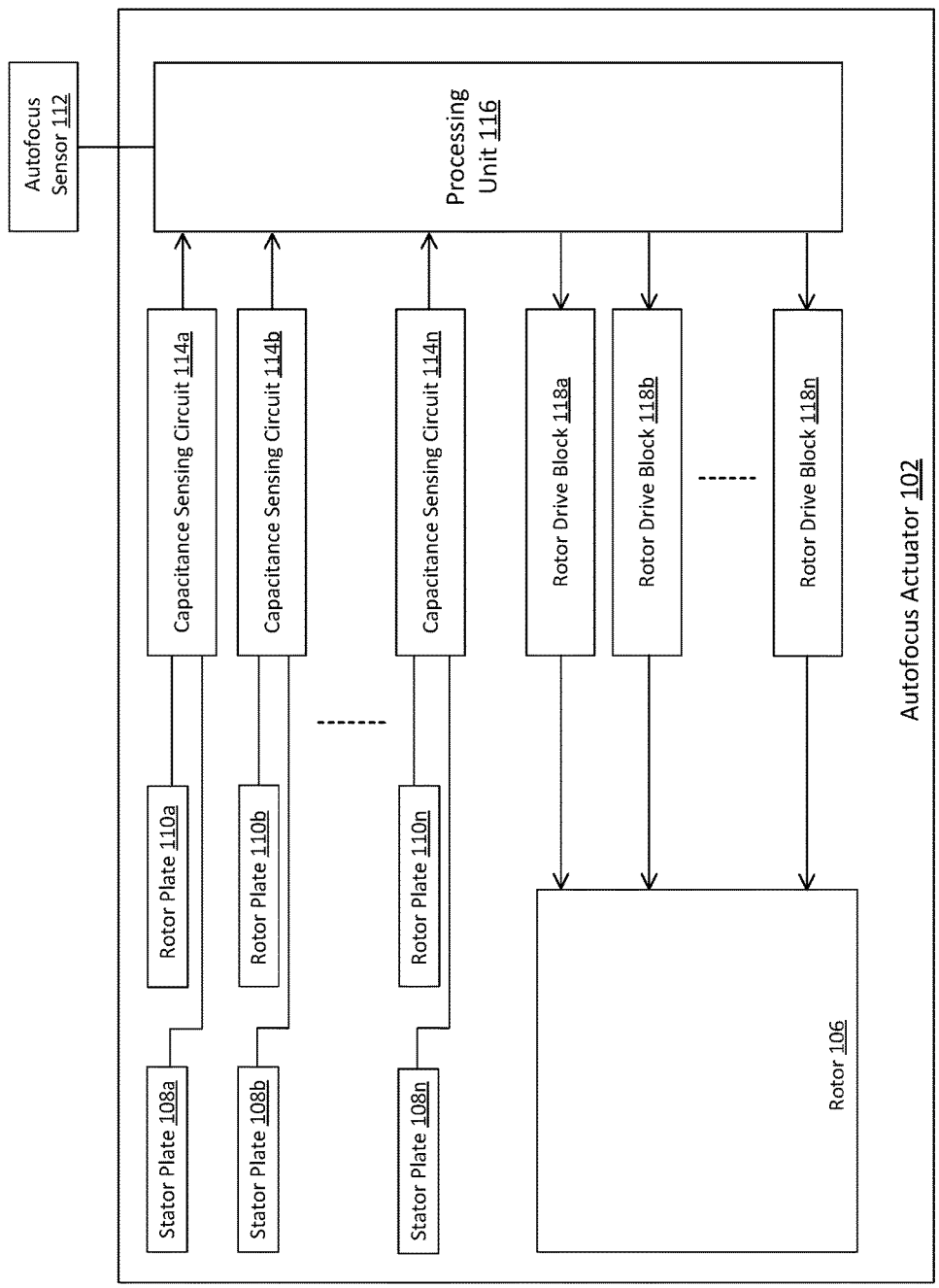
FIG. 7 illustrates still another example of the autofocus actuator control system 100, according to an exemplary embodiment of the present disclosure.

FIG. 7 illustrates still another example of the autofocus actuator control system 100, according to an exemplary embodiment of the present disclosure. As can be seen, in this example, the autofocus actuator 102 comprises the rotor 106, stator plates 108a-n as shown, rotor plates 110a-n as shown, capacitance sensing circuits 114a-n as shown, rotor drive blocks 118a-n as shown, the processing unit 116, and/or any other components. In this example, the processing unit 116 is operatively connected to the autofocus sensor 112 to receive/obtain a-n predetermined distances and a-n predetermined directions.

In this example, a-n capacitances are created by a-n pairs of rotor plates and stator plates: the pair of the stator plate 108a and the rotor plate 110a, . . . , the pair of the stator plate 108n and the rotor plate 110n. The capacitance sensing circuits 114a-n are configured to measure a-n capacitance values corresponding to the a-n created capacitances. The processing unit 116 is configured to receive/obtain the a-n measured capacitance values from the capacitance sensing circuits 114a-n. Based on the a-n predetermined distances and the a-n predetermined directions, the processing unit 116 is configured to determine a-n desired capacitance values. The processing unit 116 is then configured to send a-n rotor control signals to the rotor drive blocks 118a-n based on comparisons between the a-n measured capacitance values and the a-n desired capacitance values. Please reference FIG. 1, FIG. 5, FIG. 6 and their associated texts for structure and functions of other components included in this example.

Figure 8:
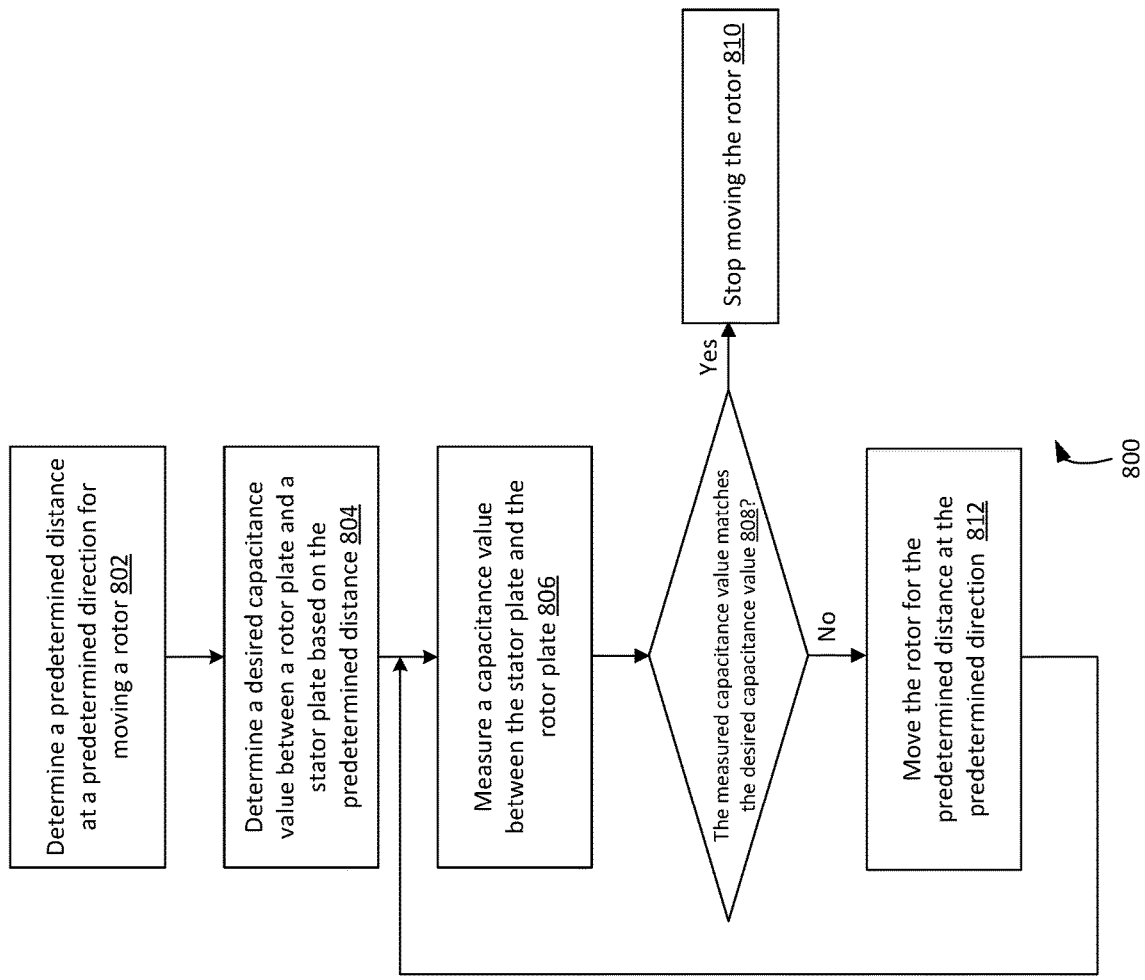
FIG. 8 illustrates an example method for controlling an autofocus actuator 102 in the autofocus actuator control system 100.

FIG. 8 illustrates an example method 800 for controlling the autofocus actuator 102 in the autofocus actuator control system 100. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

At step 802, a predetermined distance and a predetermined direction for moving a rotor in an autofocus actuator are determined.

At step 804, a desired capacitance value between a stator plate and a rotor plate is determined based on the predetermined distance and the predetermined direction.

At step 806, a capacitance is measured between the stator plate and the rotor plate at a capacitance sensing circuit. The stator plate is attached to a stator, and the rotor plate is attached to the rotor in the autofocus actuator. When the rotor moves, a distance or an overlap area between the stator plate and the rotor plate changes, resulting in a change of the capacitance between the stator plate and the rotor plate.

At step 808, the measured capacitance value is compared to the desired capacitance value. If the measured capacitance value matches the desired capacitance value, a rotor control signal is sent to a rotor drive block to stop the rotor from moving. If the measured capacitance value does not match the desired capacitance value, the rotor control signal is sent to the rotor drive block to continue moving the rotor.

At step 810, the rotor is stopped from moving and is kept stationary as the measured capacitance value matches the desired capacitance value.

At step 812, the rotor is moved for the predetermined distance at the predetermined direction. In some embodiments, a rotor control signal is sent to the rotor drive block to increase or decrease a speed for moving the rotor based on the comparison between the measured capacitance value and the desired capacitance value.

Though the method for controlling an autofocus actuator is disclosed by way of specific embodiments as described above, those embodiments are not intended to limit the present method. Based on the methods and the technical aspects disclosed herein, variations and changes may be made to the presented embodiments by those of skill in the art without departing from the spirit and the scope of the present method.

Figure 9:
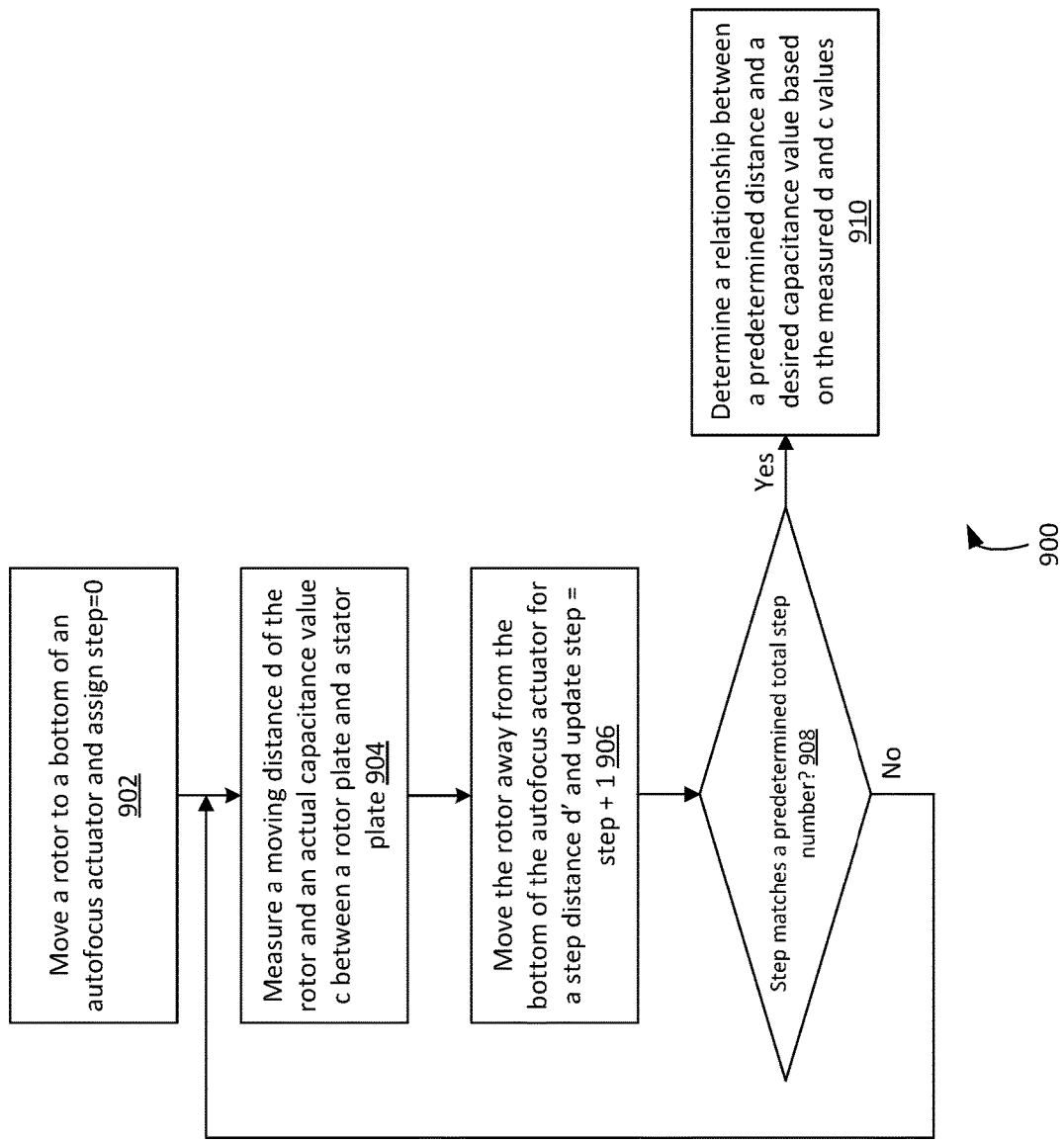
FIG. 9 illustrates an example method for determining a relationship between a predetermined distance and a desired capacitance value in the autofocus actuator control system 100.

FIG. 9 illustrates an example method 900 for determining a relationship between the predetermined distance and the desired capacitance value in the autofocus actuator control system 100. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

At step 902, a rotor is moved to a bottom of an autofocus actuator and a value 0 is assigned to a variable named "step".

At step 904, a moving distance d of the rotor is measured. An actual capacitance value c between a stator plate and a rotor plate is also measured.

At step 906, the rotor is moved away from the bottom of the autofocus actuator for a step distance d', and the variable step is updated as: step=step+1. In some embodiments, a rotor control signal is sent to a rotor drive block to move the rotor for the step distance d'.

At step 908, updated variable step is compared to a predetermined total step number. If the updated variable step matches the predetermined total step number, step 910 is executed. If the updated variable step does not match the predetermined total step number, step 904 is executed.

At step 910, a relationship between a predetermined distance and a desired capacitance value is determined based the measured d and c values at step 904. In some embodiments, a polynomial function of degree 2 is determined to express the relationship between the predetermined distance and the desired capacitance value.

Though the method for determining the relationship between the predetermined distance and the desired capacitance value is disclosed by way of specific embodiments as described above, those embodiments are not intended to limit the present method. Based on the methods and the technical aspects disclosed herein, variations and changes may be made to the presented embodiments by those of skill in the art without departing from the spirit and the scope of the present method.

What is claimed is:

1. A method for controlling an autofocus actuator based on a capacitance measured between a rotor plate attached to a rotor and a stator plate attached to a stator in the autofocus actuator, and the method comprising:

determining, at an autofocus sensor, a predetermined distance and a predetermined direction for moving the rotor in an image autofocus process;

determining, at a processing unit, a desired capacitance value between the rotor plate and the stator plate corresponding to the predetermined distance and the predetermined direction; and until the measured capacitance value matches the desired capacitance value;

measuring, at a capacitance sensing circuit, a capacitance between the rotor plate and the stator plate;

determining, at the processing unit, whether the measured capacitance value matches the desired capacitance value; and lineally moving, at a rotor drive block, the rotor in the direction.

2. The method in claim 1, further comprising measuring the capacitance between the rotor plate and the stator plate by providing a power supply to the rotor plate from a power supply module through a metal piece in the autofocus actuator.

3. The method in claim 1, wherein the autofocus actuator is protected by a metal shell, and wherein the metal shell comprises the stator plate.

4. The method in claim 1, wherein the autofocus actuator is an electromagnetic autofocus actuator comprising a magnet, wherein the magnet is the stator plate.

5. The method in claim 1, wherein the autofocus actuator is an electromagnetic autofocus actuator comprising a magnetic metal configured to facilitate a movement of the autofocus actuator, wherein the magnetic metal comprises the stator plate.

\* \* \* \* \*